United States Patent
Swift et al.

(10) Patent No.: US 8,518,506 B2
(45) Date of Patent: Aug. 27, 2013

(54) PRECISION RESISTIVE ELEMENTS AND RELATED MANUFACTURING PROCESS

(71) Applicants: Joseph A. Swift, Dolgeville, NY (US); Stanley J. Wallace, Victor, NY (US); Roger L. Bullock, Webster, NY (US)

(72) Inventors: Joseph A. Swift, Dolgeville, NY (US); Stanley J. Wallace, Victor, NY (US); Roger L. Bullock, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/706,974

(22) Filed: Dec. 6, 2012

(65) Prior Publication Data

US 2013/0097988 A1   Apr. 25, 2013

Related U.S. Application Data

(62) Division of application No. 12/120,821, filed on May 15, 2008, now Pat. No. 8,349,421.

(51) Int. Cl.
*B32B 1/02* (2006.01)
*B32B 1/08* (2006.01)
*B32B 23/00* (2006.01)

(52) U.S. Cl.
USPC ....... 428/36.1; 428/34.1; 428/34.2; 428/35.7; 428/35.9; 428/36.9

(58) Field of Classification Search
USPC .................... 428/34.1, 34.2, 35.7, 35.9, 36.1, 428/36.9
See application file for complete search history.

(56) References Cited

U.S. PATENT DOCUMENTS

| 6,255,367 | B1 | 7/2001 | Bitler et al. |
| 2003/0161781 | A1 | 8/2003 | Cabasso et al. |
| 2008/0063847 | A1 | 3/2008 | Chang et al. |

FOREIGN PATENT DOCUMENTS

| EP | 1289041 | 3/2003 |
| EP | 1553142 | 7/2005 |
| WO | 0046436 | 8/2000 |

OTHER PUBLICATIONS

European Search Report; European Patent Application No. 09156596.0, European Patent Office, Jul. 31, 2009, 3 Pages.
XP002537817, Database WPI Week 200053, Thomas Scientific, London, GB; Aug. 10, 2000, Abstract.

*Primary Examiner* — Marc Patterson
(74) *Attorney, Agent, or Firm* — MH2 Technology Law Group LLP

(57) ABSTRACT

Exemplary embodiments provide precision resistive composite members and methods for manufacturing and using them. The resistive composite member can have controllable dimensions, geometric shapes, mechanical properties and resistance values. The resistive composite member can be used for high-performance sensors or instrument probes that require, for example, high contact pressure, ultra-high frequency, and/or enable state-of-the-art digital signal transmission, characterization, or measurement. The resistive composite member can include one or more "twisted-fiber-tow" or one or more arrays of "twisted-fiber-tow" contained in a suitable non-metallic or essentially non-metallic binder material. The "twisted-fiber-tow" can further include a number of fibers that are twisted individually and/or in bundles in order to control the mechanical properties and fine-tune the resistance of the resistive composite member and thus to customize the high-performance instrument probes.

20 Claims, 4 Drawing Sheets

US 8,518,506 B2

PRECISION RESISTIVE ELEMENTS AND RELATED MANUFACTURING PROCESS

CROSS REFERENCE TO RELATED APPLICATIONS

This application is a divisional of U.S. patent application Ser. No. 12/120,821 filed May 15, 2008 (allowed), the disclosure of which is incorporated by reference in its entirety.

DESCRIPTION OF THE INVENTION

1. Field of the Invention

This invention relates generally to non-metallic components that are used in the electronics and related industries and, more particularly, to the non-metallic composites with precisely-controlled resistive properties.

2. Background of the Invention

Metal-based components (e.g., metallic electric contacts such as monolithic metal electric contacts) are traditional materials that are widely used in the electronics industry. Modern electronics are used for rapidly emerging, high performance, and high value applications that have extremely demanding requirements. Adaptations of modern electronics appear in a wide spectrum of commercial and other products affecting a large number of markets and market segments, for example, aviation, entertainment, communications, printing, medical and test instrumentation, aerospace, transportation, energy, and the like. However, there is a growing number of occurrences where it is being discovered that traditional metal-based components cannot be used for certain cases of these applications.

An example of where metal-based components do not meet requirements involves arrays of contact test probes, referred to as a "bed-of-nails", whose metal probe-tips require relatively high contact physical pressures to minimize contact resistance biases in the output measurement data. The high pressures can cause physical damage to the Devices Under Test (DUTs), or to the probes, or arrays of probes themselves. Typical DUTs can include, e.g., ICs, IC-based chips, packaged ICs, and MEMS devices (e.g., having thin-layer gold-on-silicon interconnection layers), as well as circuit boards that contain large numbers of ICs, chips, or MEMS devices.

Another example of where metal-based components do not meet requirements involves, for example, an instrument probe used for high performance, ultra-high frequency, and digital oscilloscopes. Such instrument probes require a precision resistive interface situated immediately at the contact interface between DUT and dynamic probe in order to eliminate distortions to the functioning circuit containing the DUT. Any change to the stability of the probe's operational resistance, for example, due to slight contact pressure changes, corrosion of the contact interface, or to any other factor can affect the precision of the resulting measurement and/or the operability of the DUT.

Thus, there is a need to overcome these and other problems of the prior art and to provide a family of highly precise, and essentially non-metallic electric components that can be adapted for these rapidly emerging, high performance and high value applications.

SUMMARY OF THE INVENTION

According to various embodiments, the present teachings include a resistive composite member that includes a binder material and at least one twisted-fiber-tow. The twisted-fiber-tow can include a twist level and can be disposed in the binder material to form the resistive composite member. The twist level of each twisted-fiber-tow can be used to control the electrical resistance and the mechanical strength of the resistive composite member.

According to various embodiments, the present teachings also include a method for forming a resistive composite member. The composite member can be formed by disposing one or more twisted-fiber-tows within a binder polymer through the liquid binder polymer. Each twisted-fiber-tow can have a twist level to provide a precise electric resistance and an increased mechanical strength of the composite member.

According to various embodiments, the present teachings further include a method for making a probe element. In this method, a twist level of a fiber tow can be pre-determined based on a probe application requirement. A composite member can then be formed by disposing the fiber tow within a binder polymer. Prior to or during the incorporation of the fiber tow with the binder polymer, the predetermined twist level can be imposed on one or more fibers of the fiber tow.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1A:
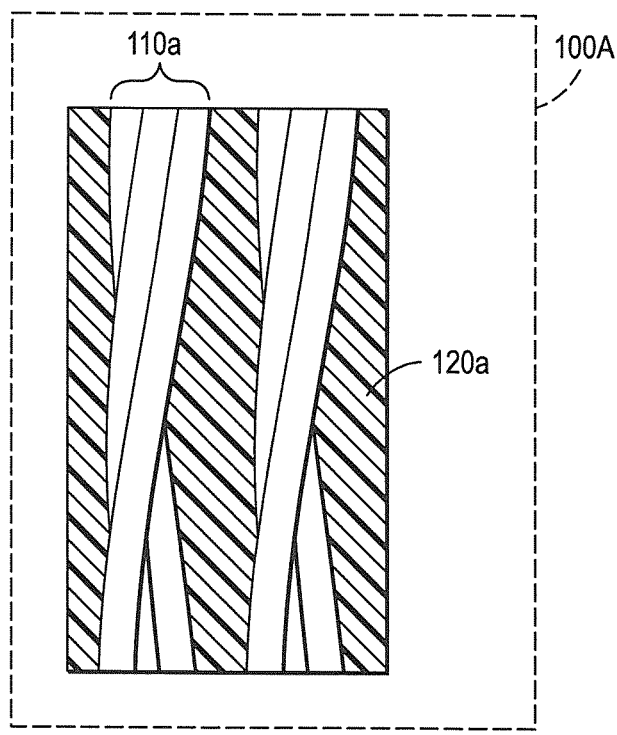
FIGS. 1A-1C depict a portion of exemplary resistive composite members in accordance with the present teachings.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

Exemplary embodiments provide precision resistive composite members and methods for manufacturing and using them. The resistive composite member can have controllable dimensions, geometric shapes, mechanical properties and electrical properties including resistance values. As disclosed herein, the resistive composite member can be used for sensors including sensor elements, and/or probes including high-performance instrument probes that require, for example, low or moderate contact pressure, ultra-high frequency response, high degree of precision in the output signal(s) and/or for other instrumentation and components including, but not limited to, digital oscilloscopes and medical instrumentation.

The resistive composite member can include one or more "twisted-fiber-tow" or one or more arrays of "twisted-fiber-tow(s)" contained in a suitable non-metallic or essentially non-metallic binder material. As used herein, the terms "non-metallic" and "essentially non-metallic" refer to a composition or a composite member that contains no metals, metal atoms, metal alloys, or the like, or contains a limited or detectable amount of metals, metal atoms/alloys at impurity or trace levels. The "twisted-fiber-tow" can further include a number of fibers that are twisted individually, in bundles or in groups of bundles in order to control the mechanical properties and fine-tune the resistance or other electrical properties of the resistive composite member and thus to customize the high-performance attribute(s) of the resultant sensors and/or probes.

As used herein and unless otherwise specified, the term "tow" refers to an untwisted bundle of continuous fibers or filaments. Such continuous fibers or filaments can include, for example, synthetic fibers, such as carbonized fibers or carbon fibers including graphite or partially carbonized fibers such as partially carbonized polyacrylonitrile (PAN) or pitch-based carbon fiber. Fiber-tows can be designated by the number of individual fibers they contain, for example, a 12K tow may contain precisely 12,000 fibers at the point of manufacture, or may contain slightly less, for example, about 11,992 fibers depending upon the quality of tow material that is specified and required for an intended application.

As used herein and unless otherwise specified, the term "twisted-fiber-tow" (also referred to herein as "fibril-component" or "fibril-element") refers to an elongated component or element that includes a large number of fibers or fiber arrays that are tightly packed and twisted into, e.g., a barber-pole-like configuration aligned essentially along a major axis of the element. For example, a particular level of twist can be imparted to mass of fibers or fiber arrays and/or to individual or groups of fibers of the fiber-tow to form twisted-fiber-tow. The use of mechanically induced twist, such as that generally used in the textile and electric wire industries, can consolidate single or multi-strand fibers into, e.g., circular and well-contained bundles, in order to provide desired mechanical and electrical properties.

The twisted-fiber-tow can be used to form a resistive composite member, e.g., for an application of high-performance test probes where traditional metal-based components can not meet the requirements. In various embodiments, the twist can be imparted either before or during the manufacture of the resistive composite. The "twisted-fiber-tow" can have a specific resistance value inherent to its component and to the process of its manufacture in order for the final resistive composite member to have the desired target resistance. The "twisted-fiber-tow" can possess twisted fibers or twisted arrays of fibers with each fiber or array functioning electrically as an equivalent number of parallel resistors. The "twisted-fiber-tow" can be fibril-shaped, semi-conductive, and non-metallic. In embodiments where more than one tow is employed in the resistive composite, twist can be imparted to all of the tows simultaneously to enable all of the individual fibers to receive the desired twist resulting from a single twisting operation.

A fiber-tow or a twisted-fiber-tow can include a fiber number of about 2 or more, e.g., about 500, about 500,000, or even higher than 500K. In an exemplary embodiment, a fiber-tow or a twisted-fiber-tow can include about 100 to about 12,000 fibers. Each fiber in the fiber-tow or the twisted-fiber-tow can take an exemplary form including, but not limited to, whisker, wire, needle, nail, thread, yarn, fabric, or combinations thereof. In various embodiments, the fiber can have at least one minor dimension in the nano-scale that, for example, a width or diameter of about 100 nanometers or less. In various embodiments, the fiber can include or be doped with, for example, silicon-, carbon-, gallium-, germanium-, tin-, nitride-, boron-carbon-, nano-structured materials, or other suitable materials.

The "twisted-fiber-tow" can be used to form the resistive composite member. As used herein and unless otherwise specified, the term "resistive composite member" (also referred to herein as "resistive member", "composite member" or "resistive composite") refers to a composite member that includes one or more "twisted-fiber-tows" or one or more arrays of "twisted-fiber-tows" disposed within a non-metallic binder material, for example, a binder polymer resin, to provide the desired combination of electrical resistance values, mechanical strength and any other related properties, such as, but not limited to, physical density, mechanical modulus, electrical capacitance, corrosion resistance, and the like.

The "twisted-fiber-tow" can have a weight concentration in the resistive composite ranging from about 1 to about 99 percent based on a total weight of the resistive composite member, wherein the non-metallic binder material can have a weight concentration ranging from about 99 to about 1 percent. In an exemplary embodiment, the twisted-fiber-tow can have a mass concentration of about 85% to about 95% with a binder polymer of about 5% to about 15% by weight in the resistive composite member. In general, attempts can be made to maximize the relative mass of fiber in a resistive composite and to employ a minimally sufficient mass of binder resin to comply with an established engineering specification, which generally considers imparting the desired combination of critical, function-related properties, such as, for example, compression strength and electrical resistance. Because the binder material can be insulating and can reside in relatively low concentrations in the disclosed resistive composite, the resistance and loading of fibers can govern the overall resistance of the composite member and of the final parts or devices made from the composite member, such as sensors, electronic components, interconnects, and test probes.

The "resistive composite member" can take forms including, but not limited to a rod, shaft, pillar, pipe, tube, hollow body or other semi-finished product or finished product resulting from various composite shaping technologies. In an exemplary embodiment, the "resistive composite member" can be a resistive rod having a diameter of, for example, about 0.002 to about 0.100 inches. According to the present teachings, there should not have specific limit to the size or diameter of a resulting part such as a rod, or a device. For example, a rod-shape column having a diameter in the range of about 1 foot to about 100 feet, or more can be fabricated and employed. Such a column can be many feet, or even many hundreds of feet in length. Similarly, very fine diameter rods, such as, for example, having a diameter less than about 0.001 inches can be employed. Clearly, what governs the resultant cross sectional size of an element regardless of its shape is the size and number of fibers and related tows that populate the cross section and the relative mass of binder polymer that is used for the composite member. In an additional example, the resistive composite rod can have a diameter ranging from about 0.010 inches to about 0.050 inches. When the resistive composite rod is configured as a high-performance contact probe, a short length of about 0.10 to about 1.0 inches can be used. Alternatively, other applications can include lengths on the macro scale. For example, a performance probe can be made from a resistive composite rod having a short length of about 0.070 inches.

The resistive composite member can be formed using various technologies including, but not limited to, pultrusion, compression, transfer-molding, filament-winding, prepreg-forming, injection molding, vacuum molding, extrusion, injection blowing, or other shaping technologies. For example, in a pultrusion process, continuous fibers/filaments/fiber-tows can be directed to enter a binder polymer bath, e.g., a resin bath, for impregnation with a matrix resin for mass production of composite materials. The level of twist can be imparted either before or during the manufacture of the final resistive composite. In various embodiments, the disclosed resistive composite member with constant cross-section can be formed by pulling the reinforcing fibers through a resin, followed by a separate preforming system, and into a heated die where the resin undergoes polymerization. The resin used herein can be a thermosetting, cyclic, or thermoplastic resin. For example, many resin types including polyester, polyurethane, vinylester and epoxy can be used in the pultrusion process.

In an exemplary embodiment, a low pressure pultrusion process can also be used to form the resistive composite by first combining a predetermined mass of the fibers/filaments of the fiber-tow with a suitable amount of liquid binder polymer, e.g., a binder resin having sufficient liquid volume that upon curing can result in a weight concentration of about 5% to about 15% in the final composite. A suitable solvent or diluent can be added to the resin to control its viscosity or other property that may impact upon, for example, how well the resin wets and impregnates the fiber mass. The liquid binder polymer can be, e.g., a thermosetting resin, such as that identified as EPON 862 manufactured by Hexion Speciality Chemicals (Columbus, Ohio). The liquid mixture, including the fibers/filaments preimpregnated with the thermosetting resin, can then be heated and further solidified (e.g., by the resin polymerization) into various shapes, for example, rods with desired shapes and dimensions. In an exemplary embodiment, the fibers can be carbon fibers supplied by, for example, Hexcel, Magna, or MTLS (Alpharetta, Ga.).

Various process parameters can be used to control the formation and properties (e.g., mechanical properties and/or resistive properties) of the resistive composite. For example, partially carbonized PAN (polyacrylonitrile) resistive carbon fibers can be used to prepare twisted-fiber-tow and to prepare the disclosed resistive composite. In this example, process parameters, such as, for example, PAN precursor chemistry, carbonization and pre-carbonization temperature profiles, peak temperature, residence time, tow tension, nitrogen pressure, and the like, can be strictly controlled by the manufacturer to form desired resistive composite.

It is noted that high fiber fill density (e.g., packing density) coupled with low resin concentrations (e.g., from about 5% to about 15% by weight) can achieve ultimate mechanical strength (e.g., mechanical shear modulus) and electrical resistance (e.g., value and/or uniformity), while the twist level of the twisted-fiber-tow can in turn increase fiber fill density. This is because increasing twist level can increase the hoop stress on the mass of fibers, or tows, or individual fibers and thereby increase the degree of consolidation or compaction of the fibers within the resistive member (e.g., the resistive rod). Such consolidation or compaction of the fibers can be controlled in a desired and necessary direction by twisting the fibers. For example, results from SEM analysis (not shown) of cross sections of rod samples show fiber packing density increases when increasing the levels of twist. Interestingly, the SEM results also reveal that the hoop stress exerted at high twist levels upon the fiber mass within the resistive rod is sufficient to deform the fibers.

In various embodiments, the twist level can be controlled by a known mechanical process that can be precisely set and controlled, for example, twist levels of a single, multifilament tow on an order of about 0.02 turns per inch (TPI) or less have been shown to be commercially achievable. During formation, as continuous filament tow and/or tows are fed into the pultrusion process, it can be twisted by revolving the feed spool around the spool's axis. The filaments can change from zero twist represented by the filaments taking on a position parallel to the long axis of the tow to a position that becomes more perpendicular to this axis as the number of turns per inch increases. The angle between the axis of the filament and the tow axis can be known as the helical angle of twist angle. As this angle is increased, the filaments can lie more nearly perpendicular to the length-wise axis. Importantly, when the fibers are inelastic, for example, as in the case of some carbon fibers, the length of the fibers need to be increased to accommodate the twist and to effectively span without breaking the axial length of the subject part. The degree of twist, measured in turns per inch (TPI), can determine precisely how long a length of multifilament tow is required to span from one end of the resistive member to the other.

For the above reasons, twist level can be a convenient and effective process control parameter to control the mechanical strength and the linear resistance of the resulting resistive composite rod to improve quality of application of the resulting exemplary resistive rods. In various embodiments, the degree of twist can range from 0 TPI to about 5 TPI, or even higher for the disclosed resistive composite member. An important twist step can therefore be included for preparing the resistive composite member. In some cases, a pre-determined twist level can be added to, e.g., resistive carbon fiber tow, prior to or during the formation process of a resistive rod. For example, a desired continuous twist can be spread into multi-fibers/filaments/tows (as illustrated in FIG. 1A) and/or separated/individual fibers (as illustrated in FIG. 1B) prior to or to the entire mass of fibers tows (as illustrated in FIG. 1C) during an exemplary pultrusion process.

Figure 1B:
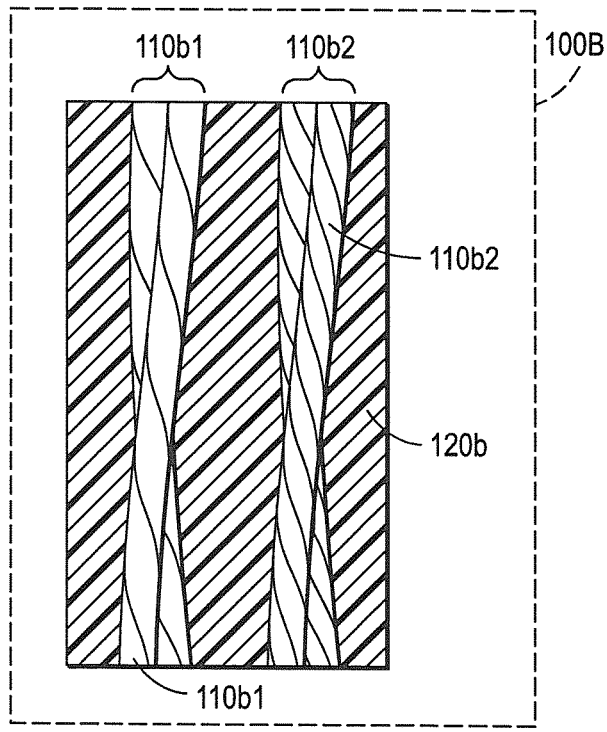
Figure 1C:
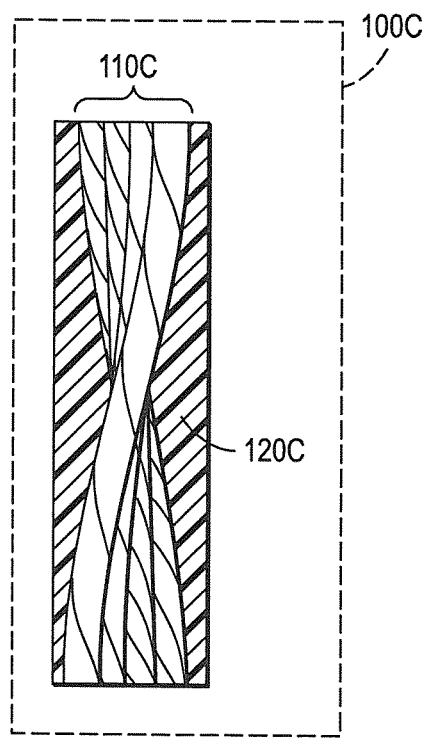

FIGS. 1A-1C depict a portion of exemplary resistive composite members 100A-C in accordance with the present teachings. As shown, the resistive composite member 100A can include twisted-fiber-tows 110a formed within a resin matrix 120a with twist imposed on the fiber mass contained within the tows and thusly results in one, or more twisted-fiber-tows 110a having same twist level. This type of twist can be referred to herein as "in-tow twist". In various embodiments, as shown in FIG. 1B, various tows with each tow having different twist levels, e.g., shown as 100b1 or 100b2, can be employed for the resistive composite 100B. In comparison, the member 100C in FIG. 1C can include twisted-fiber-tows 110c where a plurality of tows are simultaneously twisted together and formed within a resin matrix 120c. These type twists shown in FIG. 1B and FIG. 1C can be referred to as "in-composite twist", or "in-rod twist".

While each resistive composite member 100A, 100B or 100C shown in FIGS. 1A-1C includes two twisted-fiber-tows 110, it is contemplated each composite member 100 can include less than, or more than, two twisted-fiber-tows. In addition, it should be readily apparent to one of ordinary skill in the art that the resistive composite members 100A-C depicted in FIGS. 1A-1C represent generalized schematic illustrations and that other fibers/components/members can be added or existing fibers/components/members can be removed or modified. Further, the direction of twist employed for each of the twisted fiber tows can be the same for each or may be different depending upon the requirements of the composite manufacturing process or the end application.

Figure 2A:
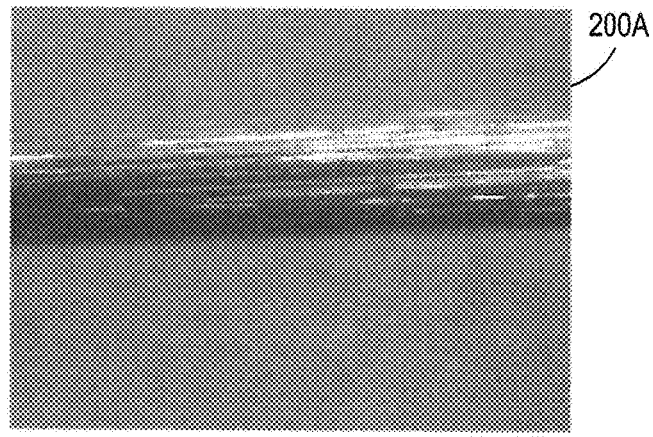
FIGS. 2A-2C depict results for exemplary resistive composite rods having various twist levels in accordance with the present teachings.
Figure 2B:
Figure 2C:

FIGS. 2A-2C illustrate exemplary results for resistive composite rods having various twist degrees in accordance with the present teachings. As shown, FIGS. 2A-2C show top views of the exemplary resistive composite rods illustrating the notion of tow twist from rod 200A through rod 200B to rod 200C. Specifically, the rod 200A does not include any twist for comparison purpose and has been fabricated from a tow containing essentially zero twist. The tow is solidified into a rod-shaped element by use of a suitable liquid binder resin that has been suitably crosslinked. The zero twist tow is also referred to as a "flat tow" or "flat twist tow". In FIG. 2A, the preponderance of fibers lays essentiality parallel to the length-wise axis of the rod which indicates that the length of the individual fibers is essentially the same as the overall length of the rod. The rod 200B includes a moderate degree of twist (see FIG. 2B), for example, in the range of about 0.2 to about 0.4 turns per inch shown as a spiral pattern along the surface of the rod, while rod 200C (see FIG. 2C) includes a high degree twist, for example, in the range of about 2.0 to about 3.0 TPI as a more pronounced spiral pattern along the surface of the rod 200C. In the cases shown in FIGS. 2A-2C, the length of the individual fibers spanning the length of the rod-shaped element is significantly longer than the length of the element.

As disclosed, the twist degree can also determine the degree of fiber compaction and final density of the final resistive composite member. Since the resistance per length (R/L) of the tow is often predetermined by, e.g., the carbon fiber manufacturer, twist can therefore be used as a process control variable to establish a higher overall length or mass of fibers within the resistive composite, which can be adjusted to fit within the constraint of the required resistive length and diameter. Therefore, the degree of twist can be used to fine-tune the resistance of the formed resistive composite member.

In practice, twisting (and even un-twisting) of fiber tows can be performed by the fiber manufacturer, by the contract converter, or by the pultruder. Twist can be identified as a mechanism to increase overall shear strength (as illustrated in FIG. 3) and overall electrical resistance (as illustrated in FIG. 4) of the resistive composite member (e.g., 200B or 200C in FIGS. 2B-2C).

Figure 3:
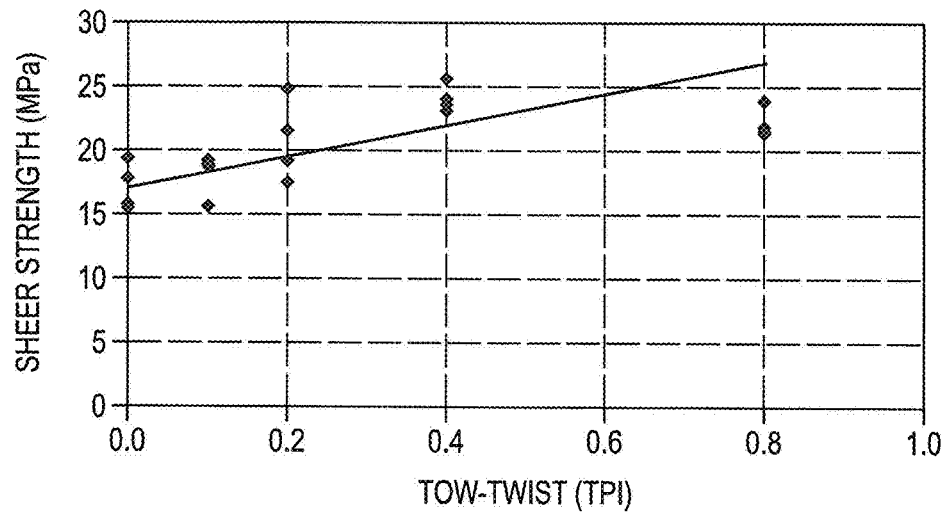
FIG. 3 depicts an exemplary result showing the effect of twist level upon the mechanical shear strength of an exemplary resistive composite rod in accordance with the present teachings.

FIG. 3 depicts an exemplary result showing the effect of tow twist level upon the mechanical shear strength of an exemplary resistive composite rod in accordance with the present teachings. The exemplary resistive composite rod can have a diameter of about 0.022 inches to about 0.023 inches. The exemplary resistive composite can include resistive carbon fibers that are pultruded through an epoxy resin impregnation bath and cured into a solid rod. As indicated in FIG. 3, when the level of twist is increased from about 0 to about 0.4 TPI, the resulting carbon fiber resistive composite rod can have an increase of more than 30% in strength for a shear strength of about 16 MPa to about 22 MPa or higher. This increased shear strength can meet the strength requirement of, e.g., a contact probe application.

Figure 4:
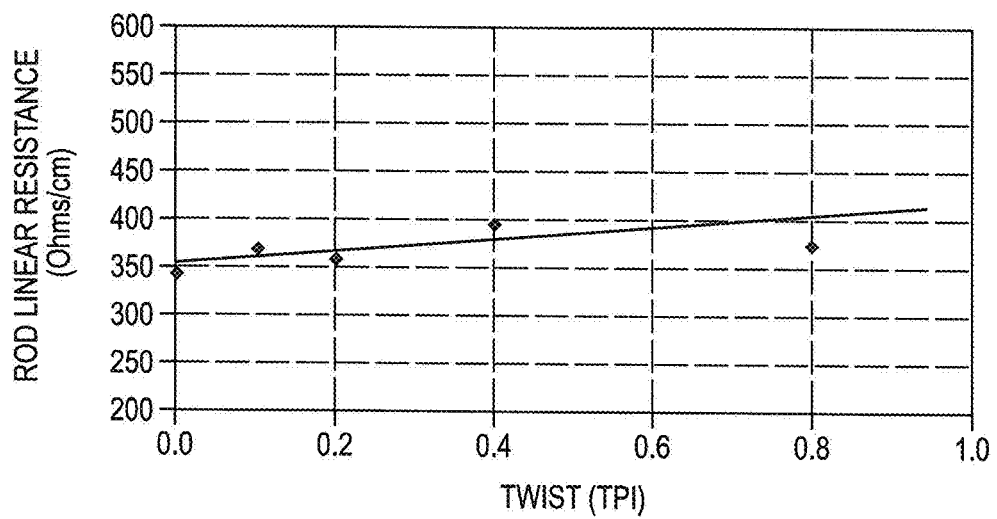
FIG. 4 depicts an exemplary result showing the effect of twist level upon the linear DC resistance of the exemplary resistive composite rod in accordance with the present teachings.

FIG. 4 depicts an exemplary result showing the effect of tow twist level upon the linear DC resistance of the exemplary resistive composite rod in accordance with the present teachings. In this example, a series of resistive carbon fiber pultruded rod samples are prepared having various levels of twist imparted to the fiber mass (tow) contained within the exemplary resistive composite rod. The twisting operation is performed by a pultruder from DFI Pultruded Composites, Inc. As indicated in FIG. 4, a linear increase in the resistance R/L of nearly 10% is recorded due to the increasing level of twist over a range from about 0 TPI to about 0.8 TPI. In addition, other experimental results (not shown) show that the twist level can be increased to bout 3.1 TPI or higher in order to increase the resistance of the resistive rod. In an exemplary embodiment, the addition of twist can increase liner resistance of the pultruded resistive composite rods for a factor of about 20% or higher.

In this manner, as shown in FIGS. 2-4, the use of twisted-fiber-tow for the resistive composite member can increase the fibril fill density to a desired level, and finely-tune the mechanical properties as well as the end-to-end resistance of the final resistive composite. The resistive composite member can have a mechanical shear strength of about 15 MPa or higher and a linear DC resistance of about 350 ohm/cm or higher. In general, by selection of appropriate fiber tows having desired electrical and mechanical properties, by use of the appropriate process to manufacture the desired resistive composite, and, by use of selected twist level of the tow twist, any desired combination of component properties can be obtained. Such electrical resistance can be measured by a conventional 2-pin DC technique and reported in terms of resistance (ohms) per unit length (cm).

In various embodiments, the disclosed resistive composite member (e.g., 100A-B shown in FIGS. 1A-1B) can have surface modification in order to accommodate various applications. For example, in order to prepare suitable sensors or probe contact devices, various materials and techniques can be used to modify surfaces of the prepared composite member. In an exemplary embodiment, waterjet processes (e.g., from University of Rhode Island and/or LAI, Westminster, Md.) and eximer laser processes (e.g., from Resonetics, Corp. Nashua, N.H.) can be used to prepare end and side surfaces of the prepared exemplary rods into suitable end-applications' devices.

The disclosed resistive composite members having controllable electrical resistance and mechanical strength can be used in various applications. For example, the disclosed resistive composite member can be used as an instrument probe element for ultrahigh frequency (e.g., oscilloscope) electrical measurements in the electrical test industry. Such resistive composite probe material can overcome major drawbacks of the conventional probe materials by possessing sufficient and controlled mechanical strength, and electrical resistance through the twisting step in the manufacturing. These probe elements and their manufacturing processes from the resistive composite can be beneficial to, for example, those suppliers who are in the process of building & scaling component production to meet the projected demand.

For proper operation of the probe element, for example, it is noted that a certain level of resistive loss can be present immediately at the point(s) of contact between the probe(s) and devices under test (DUTs). Since more than one probe may typically be used to measure and/or monitor numerous locations on a DUT or on the large circuits containing the DUTs, it is necessary that the probes' resistances can be controlled closely to match a specified target and across the population of probes. The functional requirement can include that the probes have a specified resistance (e.g., at about 400 ohms) and that the resistance variation amongst the probes can be no more than 0.50%. This resistive characteristic of the probe contact can buffer the operating circuit and the DUT from unwanted (probably electrostatic) current surges, from steady state parasitic current draws, and from most other unwanted noises. The resistance uniformity amongst probes can minimize probe-to-probe measurement variations. In addition, the disclosed resistive composite member can provide a relatively soft (as opposed to "plastic-like") probe contact surfaces without damaging any of the DUTs, and meanwhile, be sufficiently strong to withstand the component manufacturing and handling rigors as well as the contact pressures used in the application.

In various embodiments, an instrument probe element can be prepared by first determining a twist level of a fiber tow based on a requirement of the probe element and then forming a composite member that includes the fiber tow having the determined twist level incorporated with a binder polymer. The determined twist level can be imposed on one or more fibers of the fiber tow before or during the incorporation with the binder polymer.

In sum, fiber tow twist can be used to predictably increase the overall mechanical strength and electrical resistance of the resistive composite members used in high performance sensors, electronic components, interconnects, and instrument probes. That is, the disclosed resistive composite member and its manufacturing processes can provide unique combination of target resistance, resistance consistency, and shear strength along with the numerous other properties required by high-performance probe applications.

The use of fiber twist in the resistive composite member can provide many advantages. Firstly, critical-to-application mechanical and electrical properties of the resistive composite member can be predictably managed and reliably achieved. The precise control of the mechanical strength and the electrical resistance can be performed by the twist level of the entire fiber mass, part of the fiber mass, or each individual fiber used. Secondly, a reliable and continuous manufacturing process can be performed to prepare desired resistive composite members. Such manufacturing process can be cost effective because twist can be imparted by use of an in-line process within the process where it is most effective in achieving the desired result. Thirdly, exemplary resistive carbon fiber composite that is produced slightly out of specification can be used since the specialized manufacturing process, e.g., pultrusion, can be less sensitive to the precise coordination with supply of the highly specialized raw material. Since the fiber is very valuable, it is a benefit to be able to use slightly off-spec material by simply making minor adjustments to the pultrusion process, such as the use of in-process twisting.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for forming a composite member, comprising:
   twisting a plurality of fibers to impart a twist level to the plurality of fibers;
   forming a twisted fiber tow from the plurality of fibers; and
   disposing the twisted fiber tow within a polymer binder to form a composite member,
   wherein the twist level imparted to the plurality of fibers correlates positively with at least one of an electrical resistance and a mechanical shear strength of the composite member.

2. The method of claim 1, wherein the twisting of the plurality of fibers further comprises twisting each of the fibers individually prior to forming the twisted fiber tow.

3. The method of claim 1, wherein the twisting of the plurality of fibers further comprises:
   placing the plurality of fibers together; and
   twisting the plurality of fibers during the formation of the twisted fiber tow from the plurality of fibers subsequent to placing the plurality of fibers together.

4. The method of claim 1, further comprising forming the twisted fiber tow to have a width or a diameter of about 500 nanometers or less.

5. The method of claim 1, further comprising:
   twisting a first fiber of the plurality of fibers at a first twist level in the range of between about 0.2 to about 0.4 turns per inch (TPI); and
   twisting a second fiber of the plurality of fibers at a second twist level in the range of between about 2.0 to about 3.0 TPI, wherein the first twist level is different from the second twist level.

6. The method of claim 1, further comprising forming each of the first fiber and the second fiber to have a length of between about 0.10 to about 1.0.

7. The method of claim 1, wherein the plurality of fibers is a first plurality of fibers, the twisted fiber tow is a first twisted fiber tow having a first twist level, and the method further comprises:

twisting a second plurality of fibers to impart a second twist level to the plurality of fibers that is different than the first twist level; and disposing the first twisted fiber tow and the second twisted fiber tow within the polymer binder to form the composite member, wherein the twist level imparted to the first plurality of fibers and the second plurality of fibers correlates positively with the at least one of the electrical resistance and the mechanical shear strength of the composite member.

8. The method of claim 7, further comprising twisting the first twisted fiber tow and the second twisted fiber tow together to form the composite member.

9. A method for forming a composite member, comprising:

twisting a plurality of fibers to impart a twist level to the plurality of fibers;

forming a twisted fiber tow from the plurality of fibers; and disposing the twisted fiber tow within a polymer binder to form a composite member, wherein the twist level imparted to the plurality of fibers correlates positively with an electrical resistance of the composite member.

10. The method of claim 9, wherein the twisting of the plurality of fibers further comprises twisting each of the fibers individually prior to forming the twisted fiber tow.

11. The method of claim 9, wherein the twisting of the plurality of fibers further comprises:

placing the plurality of fibers together; and twisting the plurality of fibers during the formation of the twisted fiber tow from the plurality of fibers subsequent to placing the plurality of fibers together.

12. The method of claim 9, further comprising forming the twisted fiber tow to have a width or a diameter of about 500 nanometers or less.

13. The method of claim 9, further comprising:

twisting a first fiber of the plurality of fibers at a first twist level in the range of between about 0.2 to about 0.4 turns per inch (TPI); and twisting a second fiber of the plurality of fibers at a second twist level in the range of between about 2.0 to about 3.0 TPI, wherein the first twist level is different from the second twist level.

14. The method of claim 9, further comprising forming each of the first fiber and the second fiber to have a length of between about 0.10 to about 1.0.

15. The method of claim 9, wherein the plurality of fibers is a first plurality of fibers, the twisted fiber tow is a first twisted fiber tow having a first twist level, and the method further comprises:

twisting a second plurality of fibers to impart a second twist level to the plurality of fibers that is different than the first twist level; and disposing the first twisted fiber tow and the second twisted fiber tow within the polymer binder to form the composite member, wherein the twist level imparted to the first plurality of fibers and the second plurality of fibers correlates positively with the electrical resistance of the composite member.

16. The method of claim 15, further comprising twisting the first twisted fiber tow and the second twisted fiber tow together to form the composite member.

17. A method for forming a composite member, comprising:

twisting a plurality of fibers to impart a twist level to the plurality of fibers;

forming a twisted fiber tow from the plurality of fibers; and disposing the twisted fiber tow within a polymer binder to form a composite member, wherein the twist level imparted to the plurality of fibers correlates positively with a mechanical shear strength of the composite member.

18. The method of claim 17, further comprising:

twisting a first fiber of the plurality of fibers at a first twist level in the range of between about 0.2 to about 0.4 turns per inch (TPI); and twisting a second fiber of the plurality of fibers at a second twist level in the range of between about 2.0 to about 3.0 TPI, wherein the first twist level is different from the second twist level.

19. The method of claim 17, wherein the plurality of fibers is a first plurality of fibers, the twisted fiber tow is a first twisted fiber tow having a first twist level, and the method further comprises:

twisting a second plurality of fibers to impart a second twist level to the plurality of fibers that is different than the first twist level; and disposing the first twisted fiber tow and the second twisted fiber tow within the polymer binder to form the composite member, wherein the twist level imparted to the first plurality of fibers and the second plurality of fibers correlates positively with the mechanical shear strength of the composite member.

20. The method of claim 19, further comprising twisting the first twisted fiber tow and the second twisted fiber tow together to form the composite member.

* * * * *